July 10, 1923.
J. S. BRIDGES
1,461,209
DETACHABLE HOLDER FOR DENTAL IMPRESSION TRAYS
Filed March 13, 1922
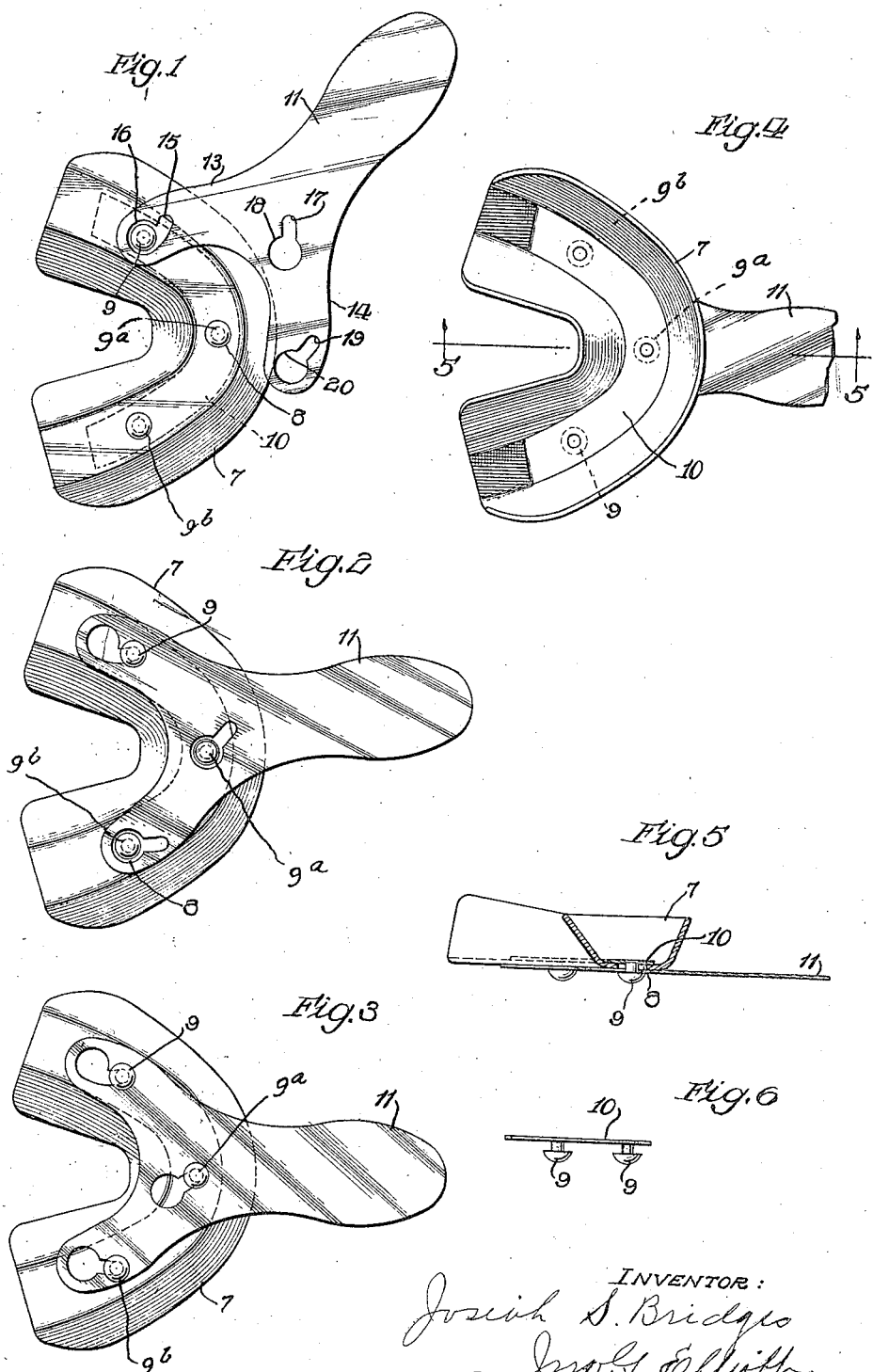

Patented July 10, 1923.

1,461,209

UNITED STATES PATENT OFFICE.

JOSIAH S. BRIDGES, OF CHICAGO, ILLINOIS.

DETACHABLE HOLDER FOR DENTAL IMPRESSION TRAYS.

Application filed March 13, 1922. Serial No. 543,186.

*To all whom it may concern:*

Be it known that I, JOSIAH S. BRIDGES, a citizen of the United States, and a resident of the city of Chicago, in the county of Cook and State of Illinois, have invented certain new and useful Improvements in Detachable Holders for Dental Impression Trays, of which the following is a specification.

This invention relates to improvements in detachable holders for dental impression trays, heretofore having had forked arms, provided with open end slots, as distinguished from closed slots, two of which adjacent the ends of the forms, are located, the one at a right-angle to the other, with the slot at the base of the arms extending at an oblique angle to the longitudinal axis of the handle, and as a result of which it is found in practice that, under the stress of the force for detaching the tray from the mouth after the plaster Paris therein is set, or wax in dental compound is cooling and stiff enough for retaining the impression, the handle frequently becomes detached before the tray is removed from the mouth of the patient.

The object of my invention broadly stated, is to provide the holder with slots preventing its accidental detachment from the tray and whereby the direction of the force for detaching the tray from the mouth piece is such as to not only prevent the detachment of the handle from its fastening devices, but to detachably lock the handle to the tray.

More specifically stated, the object of my invention is not only to have all of the slots for the holder closed, but so arranged that the force applied to the handle for removing the tray from the mouthpiece of the patient operates to severally and conjointly lock the handles to the several headed posts projected beyond the bottom surface of the tray.

With these ends in view, my invention finds embodiment in certain features of novelty construction, combination and arrangement of parts by which the said objects are attained, all as hereinafter fully described with reference to the accompanying drawings and more particularly pointed out in the claims.

In said drawings,—

Fig. 1 is a bottom plan view of a dental impression tray and handle, in which my invention finds embodiment, with the handle in its first position for connecting it with the tray.

Fig. 2 is a similar view of the handle in its second position, in which the heads of the several posts are shown projecting through the handle in position for subsequently locking the handle to the tray.

Fig. 3 is a similar view showing the handle in its final position locking it to the tray against accidental detachment therefrom.

Fig. 4 is a top plan view of a dental impression tray, showing the application of my invention to a dental tray, provided internally with a reinforcing strip to which the headed posts are secured and project thence through the bottom of the tray.

Fig. 5 is a section taken on the line 5—5 of Fig. 4; and

Fig. 6 is a detail of a portion of the reinforcing plate and two of the headed posts operatively secured thereto.

Similar characters of reference indicate the same parts in the several figures of the drawings.

The cup 7 is of the usual form and size for dental trays and is preferably formed from waterproof paper or cardboard and may be of celluloid, in the usual manner for the construction of dental cups from any of these or any other materials adapted therefor, and, as shown in the drawings, is provided with a perforation 8 towards each of its open ends, through which to project as many headed posts 9, 9ª and 9ᵇ, the shanks of which are rigidly secured to a reinforcing metal plate 10 located in the cup, but in practice, so far as my present invention is concerned, the headed posts may be riveted directly to the cup.

The handle 11 for supporting the cup is provided with branching arms 13 and 14, and with three closed end slots, two of which are located adjacent the ends of the arms, and a third in the handle intermediate the other two slots, each of which slots is provided with a circular portion for the passage of the head 9 of the several posts in open communication with a narrower inwardly projecting slot adapted to receive the stem of a headed post, and differ only in the direction relative to a line centrally longitudinally through the handle, as, for example, the narrow slot 15 projects tangentially from the circular slot 16 inwardly therefrom; whereas, the narrow slot 17 projects both axially and transversely to the circular slot 18. The narrow slot 19 projects axially to the slot 26 in the arm 14.

In other words, the circular slots and their respective narrower slots are so arranged with reference to the handle that, for engaging them with the several posts and locking the handle to the cup, the handle must be first held in the position shown in Fig. 1, with the post 9 projecting through the circular portion thereof, followed by swinging inwardly towards the cup to the position shown in Fig. 2 for projecting the heads of the posts 9ª and 9ᵇ through their opposing circular slots 18 and 20. This projection of the heads of the posts through the slots 18 and 20 is accomplished only after first pushing the handle inwardly towards the cup until the shank of the head has passed into the narrow slot 15 of the circular slot 16, following which, by swinging the handle onwardly in the same direction, as before, the posts 9ª and 9ᵇ will be forced to simultaneously enter the narrow slot 17 of the circular slot 18 and the narrow slot 19 of the circular slot 20, in the position shown in Fig. 3, and when all of the heads 9 will be over the several narrower slots and the handle be locked in its operative position to the tray against accidental detachment.

It is now to be observed that when the handle is connected with the tray, as shown in Fig. 3, it is not only locked against detachment from the force due to inserting the tray in the mouth, but, throughout the pressing of the tray with its contents against the gums and teeth of a patient, regardless of the force that may be applied for forcing the contents of the tray to its operative position, and also when tipping or oscillating the tray to release its contents from the gums and teeth, and that the force produced by a pull on the handle for removing the tray from the mouth will maintain the heads of the pins in engagement with the edges of the circular slots and therefore the accidental disengagement of the handle from the tray.

As a means for preventing the possibility of the detcahment of the handle from the tray, when drawing the latter from the mouth, it is to be noted that the slot 17 extends at an oblique angle to a line drawn through the center of length of the handle; whereas, the slots 15 and 19 extend in a direction approximately parallel to said line so that any pull on the handle tending to move the pins out of the slots 15 and 19 is resisted by the obliquely inclined wall of the slot 17, which not only forms an inclined abutment for the pin 9ª, but a stop tending to wedge the pins 9 and 9ᵇ in their respective slots against displacement by a pulling force directed lengthwise of the center of the width of the handle.

In short, by the use of closed slots in the handle, as distinguished from open end slots, and extending the slot 17 in and obliquely with reference to the length of the handle, the handle is not only conveniently attachable and detachable from, the tray, but is prevented from being accidentally detached therefrom by any of the forces to which the tray and handle are subjected when inserting and compressing the tray to its operative position in the mouth and when withdrawing for inserting the tray and compressing it in its operative position and also when withdrawing it from the mouth of the patient.

Among the advantages attributable to the dental tray of my invention is that it provides for the use of quite thin sanitary trays, reinforced as they are, by the plate 10, and for the use of a handle support therefor, readily insertable to its operative position, conveniently and quickly attached and detached from a tray, and which, when once attached to its operative position, is locked against detachment by devices which reliably prevent the detachment of any portion of the handle from the tray, due to the forces to which the tray is subjected for inserting it into the mouth, compressing and holding it to its operative position therein, and withdrawing it from the mouth without mutilating the impression received by the contents of the tray.

Having described my invention, what I claim and desire to secure by Letters Patent is:

1. A detachable holder for dental impression trays, provided with branching arms and having closed slots adjacent the ends of said arms and at a point intermediate thereof for detachably securing the tray to the holder in its operative position against accidental detachment.

2. A detachable holder for dental impression trays, having closed bayonet-joint slots adjacent the ends of said arms and at a point intermediate thereof for detachably securing the tray to the holder in its operative position against accidental detachment.

3. A detachable holder for dental trays, provided with branching arms having closed bayonetlike slots adjacent the ends of said arms and at a point intermediate thereof, the narrow portions of which slots project inwardly and extend in substantially parallel planes.

4. A detachable holder for dental impression trays, provided with branching arms having closed bayonetlike joints adjacent the ends of said arms and at a point intermediate thereof, the narrow slot of which latter projects inwardly and obliquely with reference to the planes occupied by the slots in the branching arms.

5. A detachable holder for dental impression trays, having a pair of branching arms and with a handle formed integrally therewith, said holder being provided with closed bayonetlike joints, the narrow portions of which project inwardly in substantially parallel planes and intermediate said slots, with a closed bayonetlike slot the narrow portion of which extends substantially in an oblique direction with reference to the length of said handle.

In witness whereof, I have hereunto set my hand this 9th day of March, 1922.

JOSIAH S. BRIDGES.